(12) United States Patent
Chun

(10) Patent No.: US 9,395,914 B2
(45) Date of Patent: Jul. 19, 2016

(54) METHOD FOR PROVIDING TOUCH SCREEN-BASED USER INTERFACE AND PORTABLE TERMINAL ADAPTED TO THE METHOD

(75) Inventor: Jin Wook Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 515 days.

(21) Appl. No.: 12/878,481

(22) Filed: Sep. 9, 2010

(65) Prior Publication Data

US 2011/0096087 A1    Apr. 28, 2011

(30) Foreign Application Priority Data

Oct. 26, 2009   (KR) .................. 10-2009-0101555

(51) Int. Cl.
G06F 3/00 (2006.01)
G06F 3/0488 (2013.01)
G06F 3/01 (2006.01)

(52) U.S. Cl.
CPC ........ G06F 3/04886 (2013.01); G06F 3/04883 (2013.01)

(58) Field of Classification Search
USPC ................... 715/811, 810; 345/173, 592, 598
See application file for complete search history.

(56) References Cited

U.S. PATENT DOCUMENTS

| 6,421,042 B1 * | 7/2002 | Omura et al. ................. 345/157 |
| 6,943,778 B1 * | 9/2005 | Astala et al. .................. 345/173 |
| 7,254,775 B2 * | 8/2007 | Geaghan et al. .............. 715/701 |
| 8,799,777 B1 * | 8/2014 | Lee et al. ...................... 715/702 |
| 2004/0141009 A1 * | 7/2004 | Hinckley et al. .............. 345/786 |
| 2004/0150630 A1 * | 8/2004 | Hinckley et al. .............. 345/173 |
| 2004/0172389 A1 * | 9/2004 | Galai et al. ......................... 707/3 |
| 2004/0245352 A1 * | 12/2004 | Smith .............................. 236/94 |
| 2005/0193351 A1 * | 9/2005 | Huoviala ...................... 715/815 |
| 2007/0011622 A1 * | 1/2007 | Chae et al. .................... 715/764 |
| 2007/0067273 A1 * | 3/2007 | Willcock .......................... 707/4 |
| 2007/0097113 A1 | 5/2007 | Lee et al. |
| 2007/0132761 A1 * | 6/2007 | Maruyama et al. ........ 345/440.1 |
| 2007/0155369 A1 * | 7/2007 | Jobs ...................... G06F 3/0233 455/414.1 |
| 2007/0182721 A1 * | 8/2007 | Watanabe et al. ............. 345/173 |
| 2007/0277125 A1 * | 11/2007 | Shin .................... G06F 3/04886 715/863 |
| 2008/0202823 A1 * | 8/2008 | Won et al. .................. 178/18.01 |
| 2008/0227499 A1 | 9/2008 | Suzuki et al. |
| 2008/0282179 A1 * | 11/2008 | Kim et al. ..................... 715/769 |
| 2008/0284741 A1 * | 11/2008 | Hsu et al. ...................... 345/173 |

(Continued)

FOREIGN PATENT DOCUMENTS

| CN | 101312065 A | 11/2008 |
| CN | 101453469 A | 6/2009 |

(Continued)

*Primary Examiner* — Toan Vu
(74) *Attorney, Agent, or Firm* — Jefferson IP Law, LLP

(57) ABSTRACT

A method for providing touch screen-based user interface and a portable terminal adapted to the method are provided. The method includes setting types and display order of icons to be displayed on a touch screen, sensing a touch input to the touch screen, measuring a time that the touch input is retained on the touch screen, and displaying at least one icon, in an order, according to the measured touch input retaining time and the set types and display order of icons. The touch screen-based user interface providing method can allow a user to easily search for and operate a corresponding function, via a relatively small number of touch inputting actions, thereby enhancing the user's experience while the user is using the portable terminal.

17 Claims, 8 Drawing Sheets

(56) References Cited

U.S. PATENT DOCUMENTS

| | | |
|---|---|---|
| 2008/0295028 A1 | 11/2008 | Nagasaka et al. |
| 2008/0313567 A1* | 12/2008 | Sabin et al. ............... 715/835 |
| 2009/0150541 A1 | 6/2009 | Georgis |
| 2009/0153389 A1* | 6/2009 | Kerr et al. ................. 341/176 |
| 2009/0178008 A1* | 7/2009 | Herz ................ G06F 3/04817 715/840 |
| 2009/0183100 A1 | 7/2009 | Eom et al. |
| 2009/0187863 A1* | 7/2009 | Kaneshige et al. ......... 715/850 |
| 2009/0244023 A1* | 10/2009 | Kim .................... G06F 3/0416 345/173 |
| 2009/0247233 A1 | 10/2009 | Kim |
| 2009/0247234 A1* | 10/2009 | Kim ............................ 455/566 |
| 2009/0307631 A1* | 12/2009 | Kim et al. ................... 715/830 |
| 2009/0315848 A1* | 12/2009 | Ku ..................... G06F 3/0416 345/173 |
| 2010/0031174 A1* | 2/2010 | Kim ............................ 715/764 |
| 2010/0058182 A1* | 3/2010 | Jung ................. G06F 3/04883 715/702 |
| 2010/0070931 A1* | 3/2010 | Nichols ............... G06F 3/0488 715/863 |
| 2010/0095219 A1* | 4/2010 | Stachowiak et al. ......... 715/745 |
| 2010/0115455 A1* | 5/2010 | Kim ............................ 715/781 |
| 2010/0153878 A1* | 6/2010 | Lindgren et al. ............. 715/810 |
| 2010/0235793 A1* | 9/2010 | Ording et al. ............... 715/863 |
| 2010/0295802 A1* | 11/2010 | Lee ............................ 345/173 |
| 2010/0333011 A1* | 12/2010 | Kornev ............. G06F 3/04886 715/773 |
| 2011/0029934 A1* | 2/2011 | Locker et al. ............... 715/863 |
| 2011/0080367 A1* | 4/2011 | Marchand ........... G06F 1/3215 345/174 |
| 2011/0202882 A1* | 8/2011 | Forstall et al. .............. 715/835 |
| 2012/0216139 A1* | 8/2012 | Ording et al. ............... 715/773 |
| 2013/0185680 A1* | 7/2013 | Chaudhri et al. ............ 715/863 |
| 2013/0205243 A1* | 8/2013 | Rivera et al. ............... 715/776 |
| 2013/0262993 A1* | 10/2013 | Tolmasky et al. ............ 715/256 |

FOREIGN PATENT DOCUMENTS

| | | |
|---|---|---|
| CN | 101547254 A | 9/2009 |
| JP | 2003-248551 | 9/2003 |
| JP | 2005-327143 | 11/2005 |
| JP | 2006-139615 A | 1/2006 |
| KP | 1999-0051719 A | 7/1999 |
| KP | 10-0973354 A | 7/2009 |
| KR | 10-0679039 B1 | 1/2007 |

\* cited by examiner

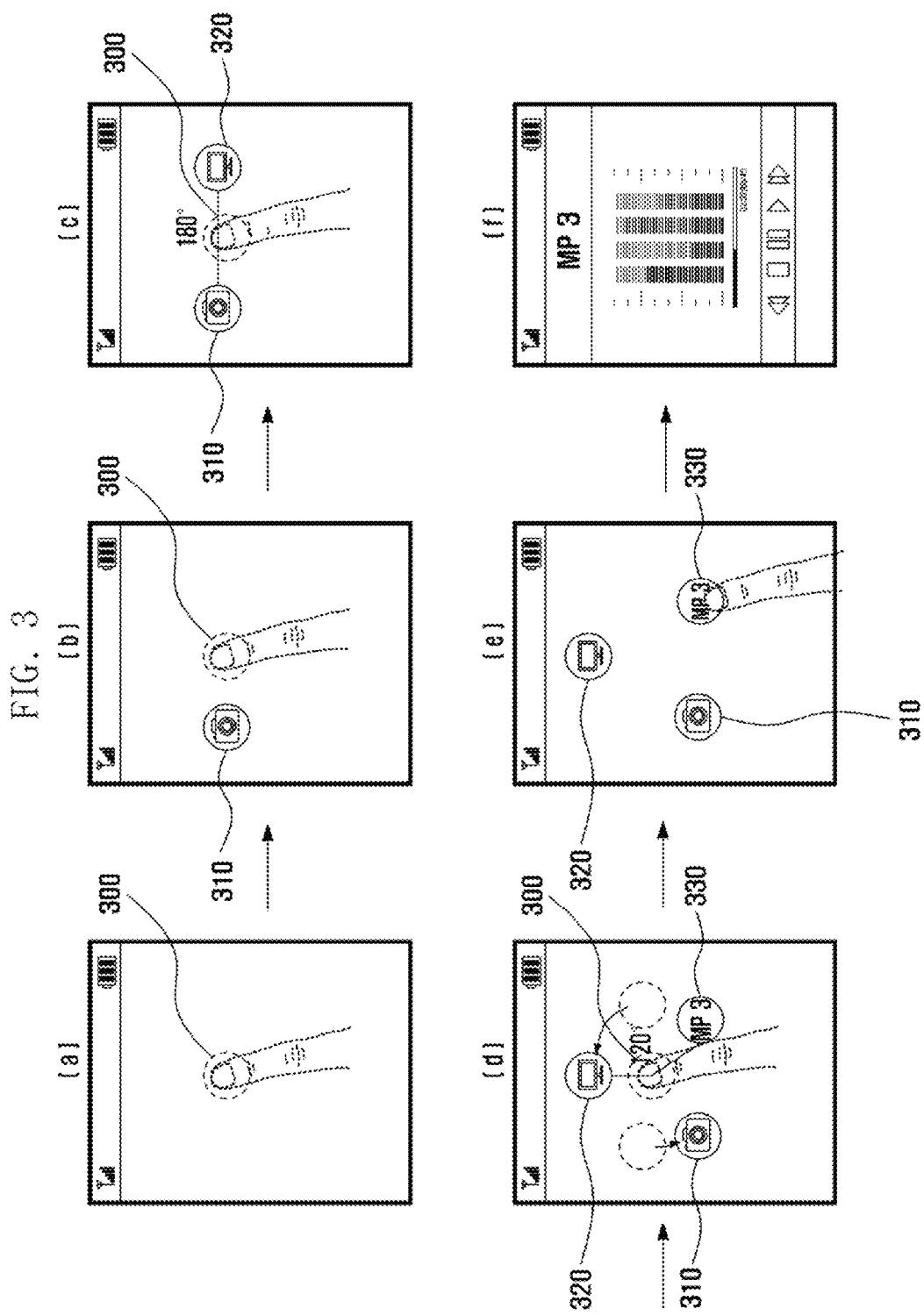

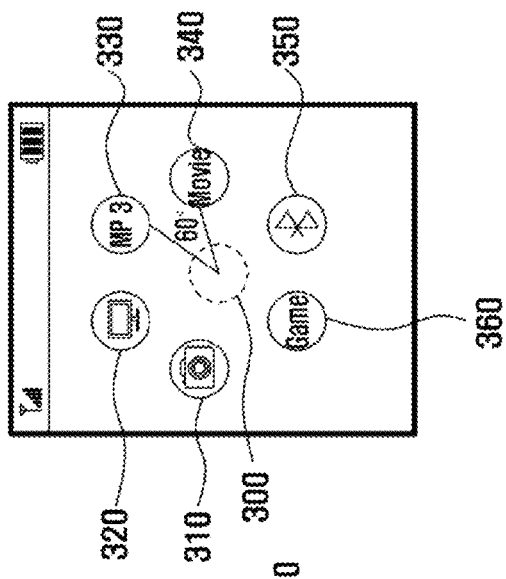
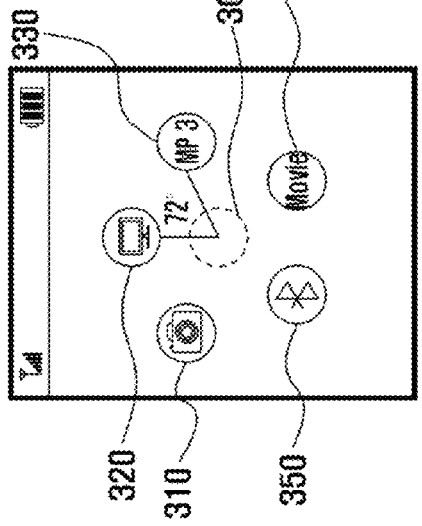
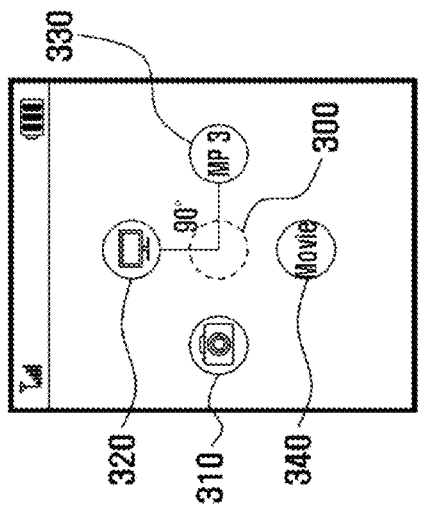

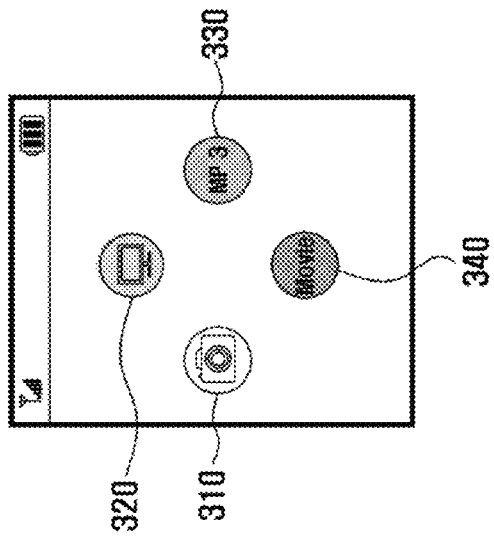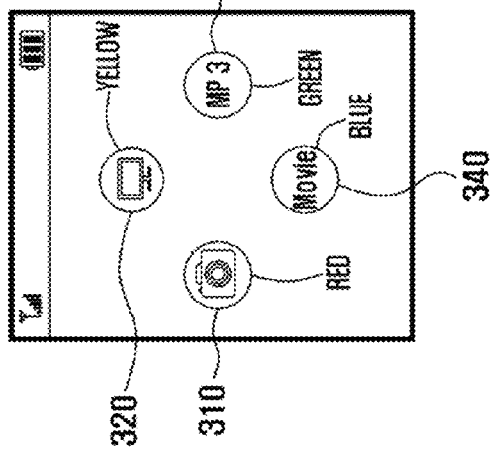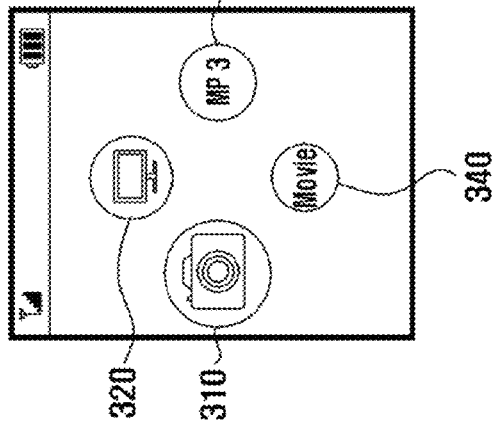

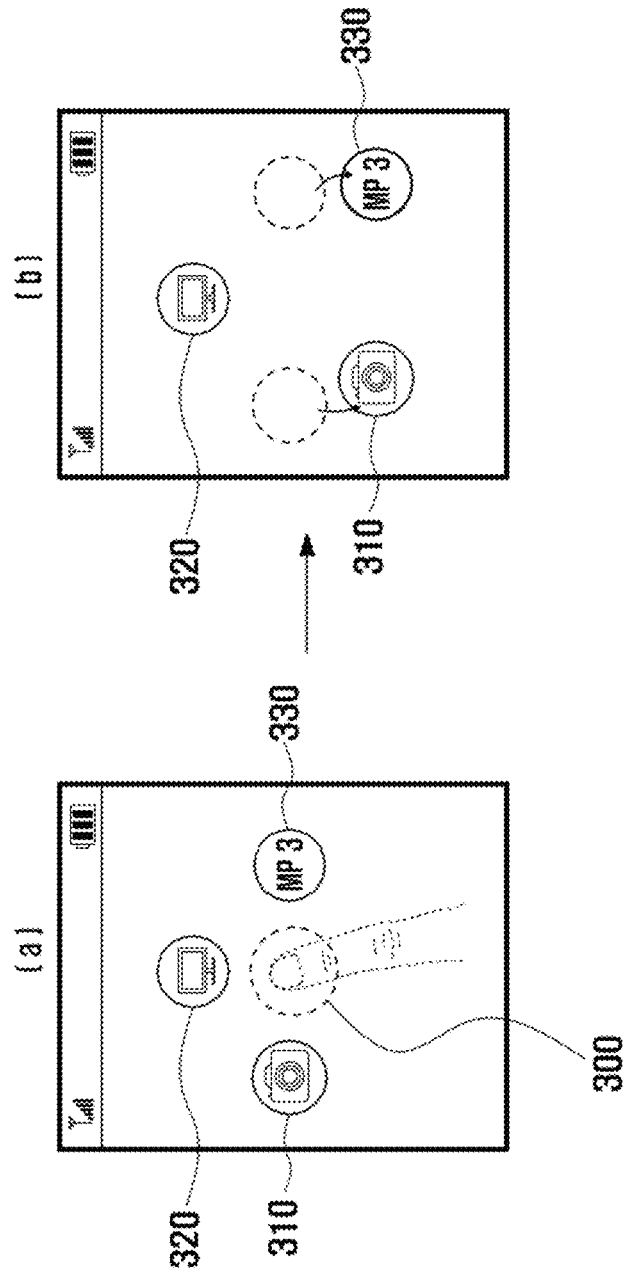

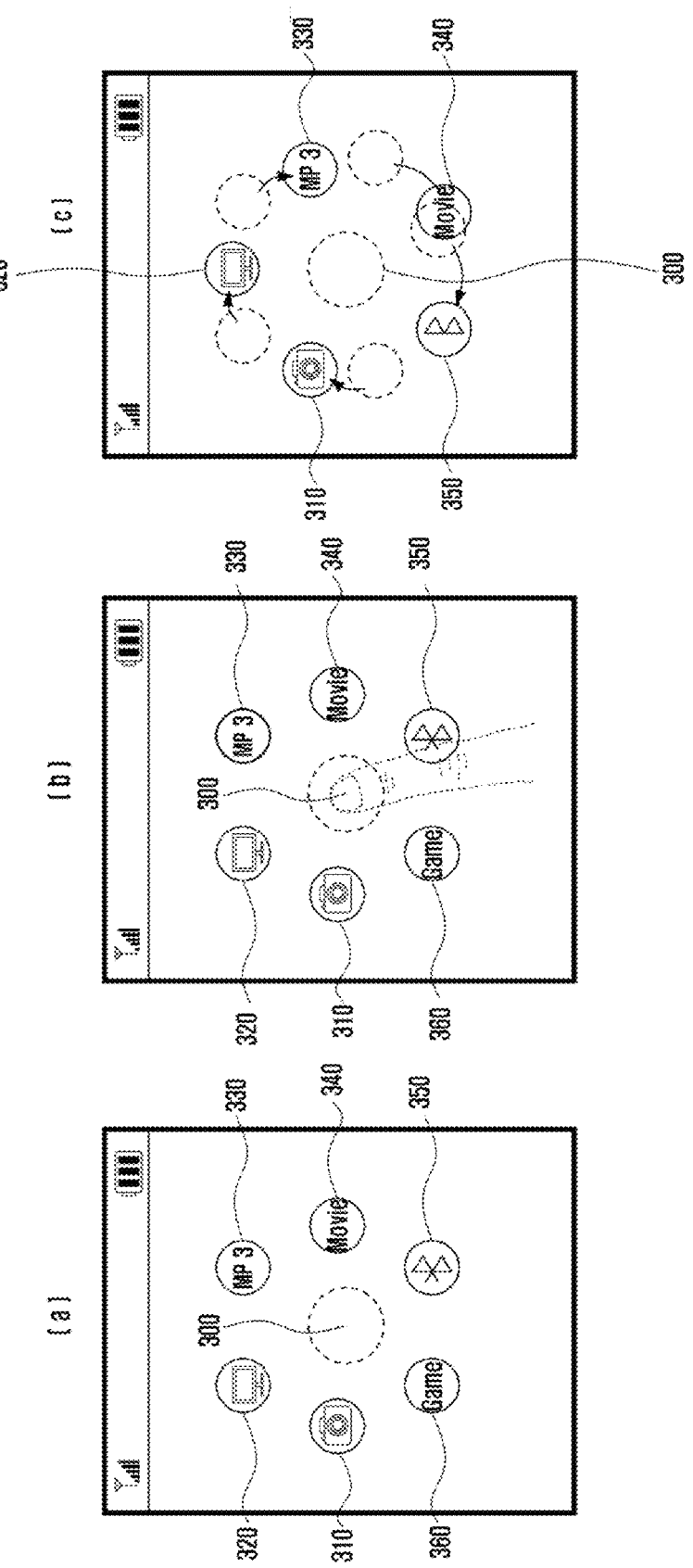

FIG. 8
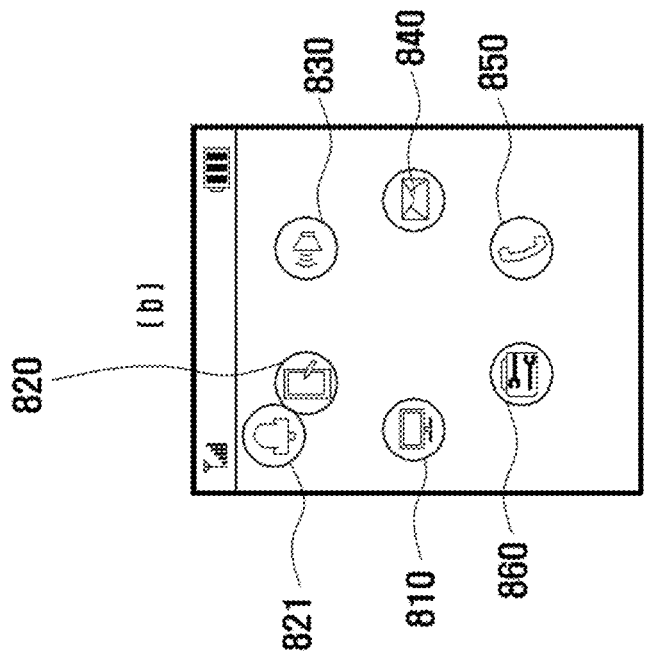
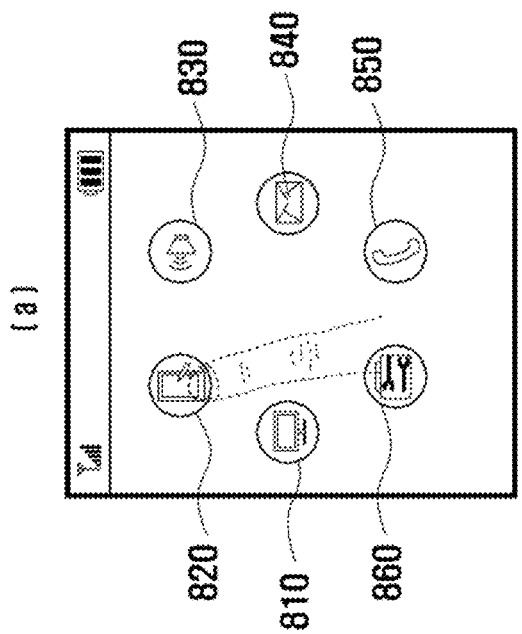

METHOD FOR PROVIDING TOUCH SCREEN-BASED USER INTERFACE AND PORTABLE TERMINAL ADAPTED TO THE METHOD

PRIORITY

This application claims the benefit under 35 U.S.C. §119(a) of a Korean patent application filed on Oct. 26, 2009 in the Korean Intellectual Property Office and assigned Serial No. 10-2009-0101555, the entire disclosure of which is hereby incorporated by reference.

BACKGROUND OF THE INVENTION

1. Field of the Invention

The present invention relates to a user interface for a portable terminal. More particularly, the present invention relates to a method for providing a touch screen-based user interface and a portable terminal adapted to the method.

2. Description of the Related Art

In recent years, as portable terminals have increasingly been equipped with a touch screen, the importance of the touch screen-based user interface has increased. Technology related to the touch screen-based user interface has been developed to enhance a user's experience. A multiple touch method (also referred to as a multi-touch method) using the changes in the distance between two or more contacts has been widely used. However, the multi-touch method can only be applied to a capacitive type of touch sensor and requires at least two fingers to touch the touch screen. Therefore, the user has difficulty operating the portable terminal using only one hand.

A single touch method can be applied to the capacitive type of touch sensors and touch sensors of other types, for example, a resistive type of touch sensor. The single touch method may allow a user to easily operate the portable terminal using the user's hand. However, the single touch method is disadvantageous in that more touch inputs are needed than with the multiple touch method.

Therefore, a new user interface is desired that can reduce the number of input touches despite the single touch method being, used, and thus enhance the portable terminal user's experience.

SUMMARY OF THE INVENTION

An aspect of the present invention is to address the above-mentioned problems and/or disadvantages and to provide at least the advantages described below. Accordingly, an aspect of the present invention is to provide a method for a User Interface (UI) that can reduce the number of input touches and can enhance the portable terminal user's experience.

The present invention further provides a portable terminal adapted to the method.

In accordance with an aspect of the present invention, a method for providing touch screen-based UI of a portable terminal is provided. The method includes setting types and display order of icons to be displayed on a touch screen, sensing a touch input to the touch screen, measuring a time that the touch input is retained on the touch screen, and displaying at least one icon, in an order, according to the measured touch input retaining time and the set types and display order of icons.

In accordance with another aspect of the present invention, a portable terminal that provides UI is provided. The terminal includes a touch screen and a controller. The touch screen can sense a user's input touch and display at least one icon. The controller can set types and display order of icons to be displayed on the touch screen. The controller can control the touch screen to sense the user's input touch. The controller can measure a period of time that the user's input touch is being retained on the touch screen. The controller can control the touch screen to display at least one icon, in an order, according to the touch input retaining time and the set types and display order of icons.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description in conjunction with the accompanying drawings, in which:

FIG. 3 shows screens that a portable terminal displays when a UI is provided, according to an exemplary embodiment of the present invention;

FIG. 4A to FIG. 4C are views illustrating screens of a portable terminal, on which icons are arranged and displayed according to icon arrangement information, according to exemplary embodiments of the present invention;

FIG. 5A is a screen on which a portable terminal is changing a size of an icon, according to a display order of icons, according to an exemplary embodiment of the present invention;

FIG. 5B is a screen on which a portable terminal is changing a color of an icon, according to a display order of icons, according to an exemplary embodiment of the present invention;

FIG. 5C is a screen on which a portable terminal is changing a icon transparency, according to a display order of icons, according to an exemplary embodiment of the present invention;

FIG. 6 shows screens that a portable terminal displays when a UI is provided, according to an exemplary embodiment of the present invention;

FIG. 7 shows screens that a portable terminal displays when a UI is provided, according to an exemplary embodiment of the present invention; and FIG. 8 shows screens that a portable terminal displays when a UI is provided, according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms or words used in the following description and the claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'icon' refers to an image representing menus of a portable terminal. For example, the icon corresponds to a menu that contains at least one submenu such as a screen setting menu, a volume adjusting menu, a message menu, a phonebook menu, etc. The term 'icon' also corresponds to a submenu that contains a reception mail box menu, a transmission mail box menu, etc., contained in a message menu, for example. In addition, the term 'icon' also refers to commands for executing applications.

In the following description, although an exemplary embodiment of the present invention is described based on a portable terminal equipped with a touch screen, it should be understood that the present invention is not limited to the described exemplary embodiment. It will be appreciated that the present invention can be applied to all information communication devices, multimedia devices, and their applications, if they are equipped with a touch screen, for example, a mobile communication terminal, a Portable Multimedia Player (PMP), a Personal Digital Assistant (PDA), a smart phone, a Moving Picture Experts Group Audio Layer 3 (MP3) player, etc.

Figure 1:
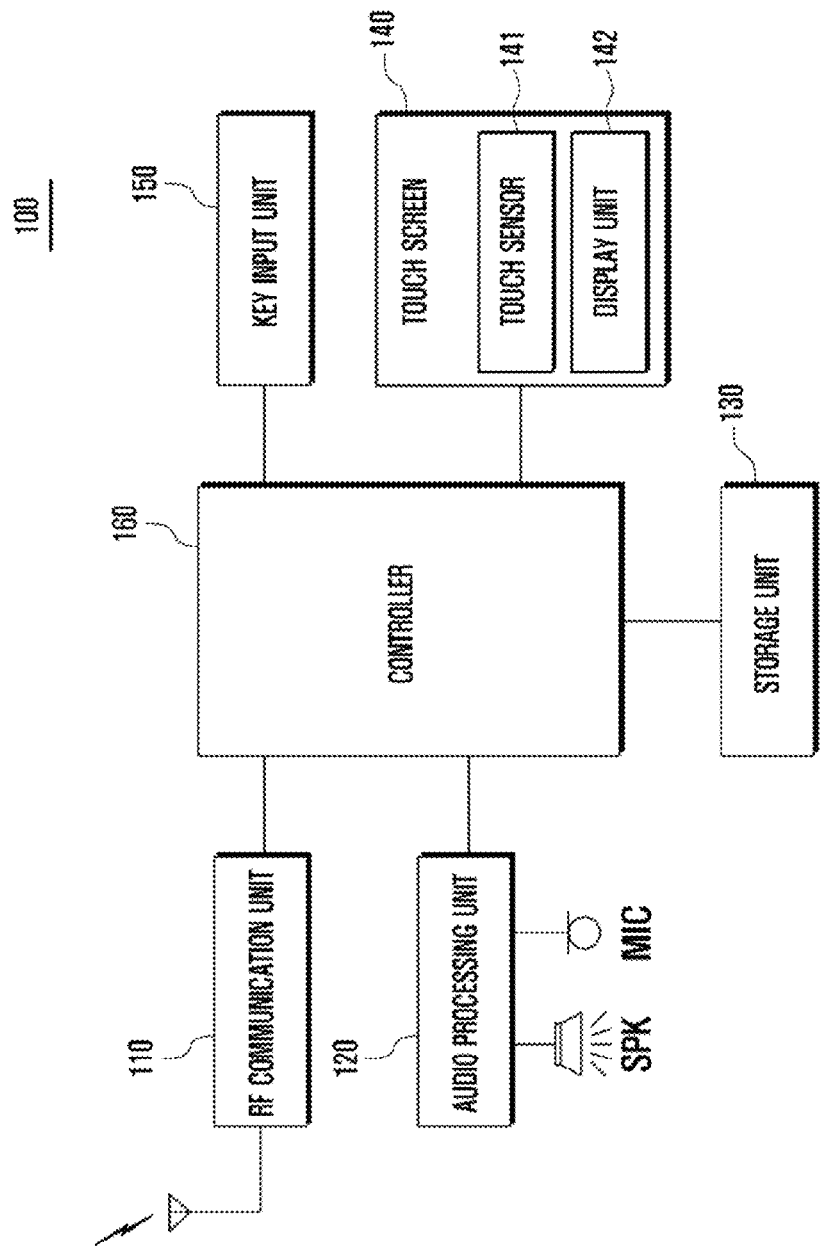
FIG. 1 is a schematic block diagram illustrating a touch screen-based portable terminal according to an exemplary embodiment of the present invention.

FIG. 1 is a schematic block diagram illustrating a touch screen-based portable terminal according to an exemplary embodiment of the present invention.

Referring, to FIG. 1, the portable terminal 100 includes a Radio Frequency (RE) communication unit 110, an audio processing unit 120, a storage unit 130, a touch screen 140, a key input unit 150, and a controller 160.

The RF communication unit 110 serves to wirelessly transmit and receive data to and from other communication systems. The RF communication unit 110 includes an RF transmitter for up-converting the frequency of signals to be transmitted and amplifying the signals and an RF receiver for low-noise amplifying received RF signals and down-converting the frequency of the received RF signals. The RF communication unit 110 receives data via an RF channel and outputs the received data to the controller 160. The RF communication unit 110 also transmits data, output from the controller 160, via the RF channel.

The audio processing unit 120 may include COder-DECoders (CODECs). The CODECs are comprised of a data CODEC for processing packet data, etc. and an audio CODEC for processing audio signals, such as voice signals, etc. The audio CODEC converts digital audio signals into analog audio signals and outputs them via, a speaker SPK. The audio CODEC also converts analog audio signals received by a microphone MIC into digital audio signals.

The storage unit 130 stores programs required to operate the portable terminal 100 and data generated when the portable terminal 100 is operated. In an exemplary embodiment of the present invention, the storage unit 130 stores information regarding the types of and the display order of icons that will be displayed on a display unit 142 of the touch screen 140. The storage unit 130 stores icon arrangement information corresponding to a touch input retaining time. The storage unit 130 also stores icon arrangement information corresponding to the number of icons displayed on the display unit 142. The storage unit 130 can store information regarding icon images and information regarding the maximum number of icons to be displayed on one screen.

The touch screen 140 includes a touch sensor 141 and a display unit 142. The touch sensor 141 senses a touch input by a user, creates a sensing signal corresponding to the input touch, and outputs the sensing signal to the controller 160. In an exemplary embodiment of the present invention, the touch sensor 141 is implemented with one of a capacitive overlay touch sensor, a resistive overlay touch sensor, an infrared beam touch sensor, a pressure sensor, etc. It should be understood that the present invention is not limited to the listed touch sensors. The touch sensor 141 can be implemented with any type of sensor if they can sense a touching or pressing action of an object. The sensing signal created by the touch sensor 141 contains information regarding a coordinate position (x, y) where a touch has occurred.

The display unit 142 may be implemented with a Liquid Crystal Display (LCD). The display unit 142 displays menus, input data, function-setting information, and additional information. For example, the display unit 142 may display a booting screen, an idle screen, a call screen, application executing screens of the portable terminal 100, and the like. In an exemplary embodiment of the present invention, the display unit 142 creates and displays icons in an order, under the control of the controller 160.

The key input unit 150 receives key operating signals for controlling the portable terminal 100, input by a user, and outputs them to the controller 160. The key input unit 150 may be implemented with a keypad with alphanumeric keys and direction keys. The key input unit 150 may be implemented as a function key at one side of the portable terminal 100. If the portable terminal 100 can be operated by only the touch sensor 141, the portable terminal 100 may not be equipped with the key input unit 150.

The controller 160 controls the operations of the elements in the portable terminal 100. The controller 160 sets information regarding the types and display order of icons to be displayed on the display unit 142, according to the touches input to the touch sensor 141, and stores information corresponding to the touches in the storage unit 130. The controller 160 receives a signal corresponding, to a user's touch sensed by the touch sensor 141 and measures a touch input retaining time. After that, the controller 160 controls the display unit 142 to display at least one icon according to the measured touch input retaining time and the information regarding the set types and display order of icons. When the controller 160 controls the display unit 142 to display a plurality of icons, the controller 160 can arrange and display the plurality of icons on the display unit 142 so that the plurality of icons can be located, being spaced apart, by the same distance, from the position where the touch is input. When the controller 160 controls the display unit 142 to display at least one icon, it can arrange and display the at least one icon on the display unit 142, according to icon arrangement information corresponding to the touch input retaining time. When the controller 160 receives a signal corresponding to a touch release sensed by the touch sensor 141, the controller 160 senses the number of icons displayed on the display unit 142 and arranges and displays the displayed icons according, to the icon arrangement information according to the number of icons.

When the controller 160 receives a signal corresponding to a touch release sensed by the touch sensor 141 and ascertains that the touch sensor 141 senses a touch action applied to one of the icons displayed on the display unit 142, the controller 160 can execute a menu corresponding to the touched icon.

The controller 160 sets the priority order of menus in a list according to the use frequency. The controller 160 can also set information regarding the types and the display order of icons to be displayed on the display unit 142, according to the set priority order of menus in a list. The controller 160 may change at least one of the transparency, color, and size of icons, according to the types and the display order of icons to be displayed, and may then display the icons on the display unit 142, where the process of changing the transparency is referred to as an alpha-blending process.

In a state where the icon displayed on the display unit 142 corresponds to the main menu icon containing at least one submenu, if the controller 160 receives a signal corresponding to a touch release sensed by the touch sensor 141 and ascertains that the touch sensor 141 senses a touch action applied to one of the icons displayed on the display unit 142, the controller 160 can measure a touch input retaining time for the touched icon and can control the display unit 142 to create and display, in an order, submenu icons contained in a menu corresponding to the touched icon, according to the touch input retaining time and information regarding the set types and display order of icons.

Figure 2:
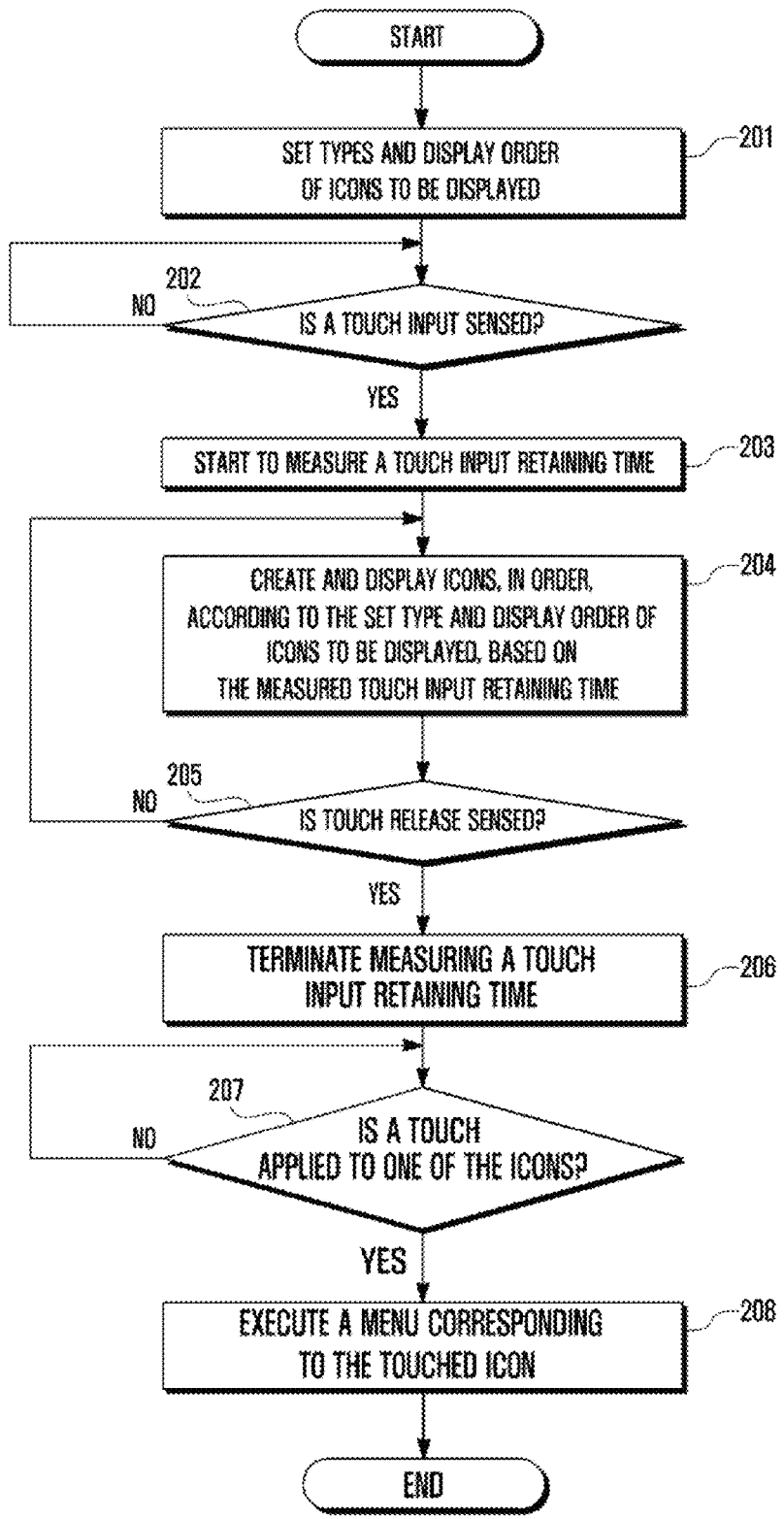
FIG. 2 is a flowchart that describes a touch screen-based User Interface (UI) according to an exemplary embodiment of the present invention.

FIG. 2 is a flowchart that describes a touch screen-based User Interface (UI) according to an exemplary embodiment of the present invention.

Referring, to FIG. 2, the controller 160 sets information regarding the types and the display order of icons to be displayed on the display unit 142 in step 201. In an exemplary embodiment of the present invention, the portable terminal 100 includes a menu through which a user can set the types and the display order of icons to be displayed on the display unit 142.

The controller 160 measures the use frequency of the respective menus, sets the priority order of menus in a list according, to the measured use frequencies, and automatically sets the types and the display order of icons to be displayed on the display unit 142 according to the set priority order of menus in a list. The controller 160 stores information regarding the set types and display order of icons in the storage unit 130. After that, it is assumed that the portable terminal 100 is operated in an idle state and the display unit 142 displays an idle screen.

The controller 160 determines whether the touch sensor 141 senses a user's touch input in step 202. If the user's finger contacts the touch sensor 141, the touch sensor 141 senses the user's touch and transfers a sensing signal to the controller 160. The controller 160 receives the sensing signal from the touch sensor 141 and recognizes that the user has touched the touch sensor 141. The sensing signal contains coordinate information (x, y) regarding a position to which the touch is applied. In an exemplary embodiment of the present invention, it is assumed that the user touches a region of the idle screen that does not contain an icon. This is explained in further detail below by referring to FIG. 3.

FIG. 3 shows screens that a portable terminal displays when a UI is provided, according to an exemplary embodiment of the present invention.

By way of example, the types of icons described herein as being displayed on the display unit 142 include a camera menu icon 310, a Digital Multimedia Broadcasting (DMB) menu icon 320, an MP3 menu icon 330, a moving image menu icon 340, a Bluetooth menu icon 350, and a game menu icon 360, for example. It may be assumed that the display order follows the order listed above.

When the user touches a certain region 300 on the idle screen as shown in diagram A of FIG. 3, the controller 160 starts to measure a touch input retaining time of the input touch in step 203. For example, if the user maintains the touched state at the fixed point without moving the position of the input touch, the touch sensor 141 continues to transfer the sensing signal containing the same coordinate information to the controller 160, so the controller 160 can measure the touch input retaining time based on the duration of time that it receives the received sensing signal.

The controller 160 controls the display unit 142 to create and display icons, in an order, according to the measured touch input retaining time and the information regarding the set types and the display order of icons in step 204. If a touch input retaining time required to create and display icons one by one preset in the portable terminal 100, the controller 160 controls the display unit 142 to create and display icons, one by one, each time that the preset touch input retaining time has elapsed. In an exemplary embodiment of the present invention, it is assumed that T1, T2 and T3 are touch input retaining times required to create and display one icon, two icons, and three icons, respectively. The controller 160 can control the display unit 142 to create and display icons so that they are located the same distance from the position where the touch is input.

Diagram B of FIG. 3 shows a screen after T1 has elapsed from a time point when the user first inputs a touch. As shown in diagram B of FIG. 3, one icon, for example a camera menu icon 310, is created and displayed near the touch input position 300. Likewise, diagram C of FIG. 3 shows a screen after T2 has elapsed from a time point when the user first inputs a touch. As shown in diagram C of FIG. 3, two icons, for example a camera menu icon 310 and a DMB menu icon 320, are created and displayed near the touch input position 300. In addition, diagram D of FIG. 3 shows a screen after T3 has elapsed from a time point when the user first inputs a touch. As shown in diagram D of FIG. 3, three icons, for example, a camera menu icon 310, a DMB menu icon 320, and an MP3 menu icon 330, are created and displayed near the touch input position 300.

The controller 160 controls the display unit 142 to arrange and display icons according to the icon arrangement information corresponding to the measured touch input retaining time. For example, the icon arrangement information corresponding to time T2 sets 180° as the arrangement of icons with respect to the position where the touch is input. In this case, the controller 160 can control the display unit 142 to arrange and display the icons at 180° with respect to the position where the touch is input. Likewise, the icon arrangement information corresponding to time T3 sets 120° as the arrangement of icons with respect to the position where the touch is input. In this case, the controller 160 can control the display unit 142 to arrange and display the icons at 180 with respect to the position where the touch is input.

Diagram C of FIG. 3 shows the arrangement of two icons, a camera menu icon 310 and a DMB menu icon 320, at 180°, with respect to the touch input position 300. In addition, diagram D of FIG. 3 shows the arrangement of two icons, i.e., a camera menu icon 310, a DMB menu icon 320, and an MP3 menu icon 330, at 120°, with respect to the touch input position 300.

As shown in diagram C of FIG. 3, if a DMB menu icon 320 is newly created and displayed, since it is required to be located at 180°, or opposite the camera menu icon 310 that has been already displayed, with respect to the touch input position 300, the position of the camera menu icon 310 does not need to be changed. However, as shown in diagram D of FIG. 3, if an MP3 menu icon 330 is newly created and displayed, since the three icons are required to be arranged at 120° with respect to the touch input position 300, at least one of the positions of the camera menu icon 310 and the DMB menu icon 320 does not need to be changed. Referring to diagram D of FIG. 3, the positions of the camera menu icon 310 and the DMB menu icon 320 differ from those of the camera menu icon 310 and the DMB menu icon 320 as shown in diagram C of FIG. 3.

FIG. 4A to FIG. 4C are views illustrating screens of a portable terminal, on which icons are arranged and displayed according to icon arrangement information, according to exemplary embodiments of the present invention. More specifically, FIG. 4A shows a screen on which the portable terminal 100 creates and displays an additional icon, for example, a moving image menu icon 340. As shown in FIG. 4A, four icons are equally arranged, spaced apart from each other at 90° with respect to the touch input position 300. FIG. 4B shows a screen on which the portable terminal 100 further creates and displays an additional icon, for example, a Bluetooth menu icon 350. As shown in FIG. 4B, five icons are equally arranged, spaced apart from each other at 72° with respect to the touch input position 300. FIG. 4C shows a screen on which the portable terminal 100 still further creates and displays an additional icon, for example, a game menu icon 360. As shown in FIG. 4A, six icons are equally arranged, spaced apart from each other at 60° with respect to the touch input position 300.

In accordance with an exemplary embodiment of the present invention, the maximum number of icons to be displayed on one screen can be set. If too many icons are displayed on one screen, the user may have difficulty searching for a corresponding menu. The controller 160 sets the maximum number of icons to be displayed on one screen and stores it in the storage unit 130. When the controller 160 controls the display unit 142 to display icons according to a touch input retaining time, it can display a number of icons equal to or less than the maximum number of icons. In an exemplary embodiment of the present invention, the portable terminal 100 contains a menu thorough which the user can set the maximum number of icons to be displayed on one screen.

In accordance with an exemplary embodiment of the present invention, the controller 160 can control the display unit 142 to change at least one of the size, color, and transparency of a displayed icon.

FIG. 5A is a screen on which a portable terminal changes a size of an icon, according to a display order of icons, according to an exemplary embodiment of the present invention. As shown in FIG. 5A, the portable terminal 100 displays the camera menu icon 310 as the large icon corresponding to the first display priority order and then gradually reduces in size and displays the DMB menu icon 320, the MP3 menu icon 330, and the moving image menu icon 340, in order. FIG. 5B is a screen on which a portable terminal is changing a color of an icon, according to a display order of icons, according to an exemplary embodiment of the present invention. As shown in FIG. 5B, the camera menu icon 310, the DMB menu icon 320, the MP3 menu icon 330, and the moving image menu icon 340 are each displayed in different colors. FIG. 5C is a screen on which the portable terminal 100 is changing the icon transparency, according to the display order of icons, and displaying it. As shown in FIG. 5C, the camera menu icon 310 the DMB menu icon 320, the MP3 menu icon 330, and the moving image menu icon 340 are each displayed with different transparencies.

After displaying icons at step 204, the controller 160 determines whether a user's touch is released via the touch sensor 141 in step 205. If the user removes the user's touch from the touch screen 140, the touch sensor 141 detects a touch release and transfers a sensing signal corresponding thereto to the controller 160. The controller 160 receives the sensing signal from the touch sensor 141 and ascertains the touch release. The controller 160 controls the display unit 142 to create and display icons order, until it ascertains that the touch release has occurred.

After ascertaining the touch release at step 205, the controller 160 terminates measuring the touch input retaining time in step 206. After that, the controller 160 controls the display unit 142 to continue displaying the current icons.

Diagram E of FIG. 3 shows a screen that the portable terminal 100 displays when the user releases a touch. As shown in diagram E of FIG. 3, the portable terminal 100 displays the icons in the same arrangement as the diagram D of FIG. 3, i.e., the icon arrangement immediately before the user releases the touch.

After that, the controller 160 controls the touch sensor 141 to detect whether the user touches one of icons displayed on the display unit 142 in step 207. If the user has touched one of icons displayed on the display unit 142 at step 207, the touch sensor 141 detects the input touch and transfers a sensing signal corresponding thereto to the controller 160. The controller 160 ascertains that the user has input a touch based on the received sensing signal. The controller 160 analyzes the coordinate information contained in the sensing signal and detects the user's touched icon.

The controller 160 executes a menu corresponding to the user's touched icon in step 208. For example, if the touched icon corresponds to an icon for executing an application, the controller 160 executes the application at step 208. Diagram F of FIG. 3 shows a screen that the portable terminal 100 displays if the touched icon is an MP3 menu icon 330. That is, Diagram F of FIG. 3 shows an MP3 menu executing screen.

When the controller 160 detects a touch release via the touch sensor 141, it controls the display unit 142 to re-arrange the currently displayed icons. In this case, the controller 160 can also store the icon arrangement information corresponding to the number of icons, displayed on the display unit 142, in the storage unit 130. Alternatively, when the controller 160 detects a touch release via the touch sensor 141, the controller 160 terminates measuring a touch input retaining time and detects the number of icons currently displayed on the display unit 142. After that, the controller 160 rearranges and displays icons, according to the icon arrangement information corresponding to the number of icons the display unit 142.

FIG. 6 shows screens that a portable terminal displays when a UI is provided, according to an exemplary embodiment of the present invention. Diagram A of FIG. 6 shows a screen that the portable terminal 100 displays after T3 has elapsed from a time point when the user first inputs a touch. As shown in diagram A of FIG. 6, three icons, for example, a camera menu icon 310, a DMB menu icon 320, and an MP3 menu icon 330, are displayed on the screen. Diagram B of FIG. 6 shows a screen that the portable terminal 100 displays when the user releases a touch. As shown in diagram B of FIG. 6, the portable terminal 100 rearranges the three icons displayed as in diagram A of FIG. 6. If the icon arrangement information sets the angle among the three icons to 120° with respect to the touch input position, the portable terminal 100 arranges the camera menu icon 310, the DMB menu icon 320, and the MP3 menu icon 330 at 120° with respect to the touch input position 300.

In accordance with an exemplary embodiment of the present invention, the portable terminal 100 can remove icons, in order, from the display unit 142, according to a touch input retaining time. In a state where the user releases a touch and icons are being displayed on the display unit 142, if the user applies a touch again, which is called a re-touch, to the position where the user has previously released the touch, the controller 160 detects the currently input touch via, the touch sensor 141. After that, the controller 160 measures a touch input retaining time (i.e., a re-touch input retaining time) and removes icons, in the reverse order, i.e., opposite to the order of displaying the icons, from the display unit 142, according to the measured touch input retaining time (i.e., the measured re-touch input retaining time).

FIG. 7 shows screens that a portable terminal displays when a UI is provided, according to an exemplary embodiment of the present invention.

Referring to FIG. 7, diagram A shows a screen that the portable terminal 100 displays when a user inputs touches to display six icons and then releases the touches. Diagram B of FIG. 7 shows a screen that the portable terminal 100 displays when the user re-inputs a touch to the position 300 where the user has released a previous touch. Diagram C of FIG. 7 shows a screen that the portable terminal 100 displays after a certain period of time, for example, T1, has elapsed from a time point when the user inputs a touch. As shown in diagram C of FIG. 7, the portable terminal 100 removes a game menu icon 360 from the screen shown in diagram B of FIG. 7 and then rearranges and displays the remaining icons, 310, 320, 330, 340, and 350.

If the user inputs a touch on one of the regions displaying where no icons are displayed, excluding the region 300 where the touch has been released, the controller 160 detects the user's input touch via, the touch sensor 141 and removes all the icons currently displayed on the display unit 142. Alternatively, if the user has released a touch and then does not re-input a touch, the controller 160 releases the touch and then measures an elapsed time. If the controller 160 ascertains that the elapsed time exceeds a preset time, it removes all the icons currently displayed on the display unit 142.

In accordance with an exemplary embodiment of the present invention, the portable terminal 100 can display the main menu icon and submenu icons on one screen. If the controller 160 detects a user's input touch via the touch sensor 141, it creates an icon on the display unit 142. It is assumed that the icon refers to a main menu containing at least one submenu. If the controller 160 detects a touch release via the touch sensor 141 in a state where icons are being displayed, it controls the touch sensor 141 to determine whether a touch is applied to one of the icons. If the controller 160 ascertains that a touch is applied to one of the icons, it measures a touch input retaining time that the touch is being applied to the icon. After that, the controller 160 creates and displays an icon of submenus, contained in a menus corresponding to the touched icon, according to the measured touch input retaining time and the types and the display order of icons to be displayed.

FIG. 8 shows screens that a portable terminal displays when a UI a provided, according to an exemplary embodiment of the present invention.

Referring, to FIG. 8, diagram A shows a screen that the portable terminal 100 displays when a user inputs touches to display six icons and then releases the touches. As shown in diagram B of FIG. 8, when the portable terminal 100 displays six icons, for example, a screen menu icon 810, a diary menu icon 820, a volume menu icon 830, a message menu icon 840, a phonebook menu icon 850, and a user setting menu icon 860, the user touches the diary menu icon 820. Diagram B of FIG. 8 shows a screen that the portable terminal 100 displays after a certain period of time, for example, T1, has elapsed from a time point when the user first touched the diary menu icon 820. The portable terminal 100 displays a morning call menu icon 821, corresponding to a submenu of the diary menu, near the diary menu icon 820.

As described above, the portable terminal 100 according to an exemplary embodiment of the present invention can measurer a user's touch input retaining time and then create and display icons according to the measured times. Therefore, the user can easily search for or execute a corresponding function via a relatively small number of inputting actions. In addition, various icon arrangements enhance the user's experience while the user is using the portable terminal.

As described above, the touch screen-based user interface, according to an exemplary embodiment of the present invention, can allow a user to easily search for and operate a corresponding function, via a relatively small number of touch inputting actions, thereby enhancing the user's experience while the user is using the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing touch screen-based user interface of a portable terminal, the method comprising:

detecting a touch input at a region of a touch screen that does not contain an icon;

displaying a first set of at least one icon near a determined touch input position in response to the touch input retained at the determined touch input position on the touch screen for longer than a first time interval;

displaying a second set of at least one icon near the determined touch input position, in addition to displaying the first set of at least one icon, in response to the touch input retained at the determined touch input position on the touch screen for longer than a second time interval plus the first time interval, the second time interval being sequential to the first time interval;

detecting a number of icons included in the displayed first set and second set of at least one icon;

re-arranging and displaying icons included in the displayed first set and the displayed second set of at least one icon according to information regarding icon arrangement that is set corresponding to the detected number of the icons included in the displayed first set and the displayed second set of at least one icon;

detecting a touch release;

detecting a re-touch input applied to a position where the touch release has occurred;

measuring a re-touch input retaining time that the re-touch input is being applied to the position where the touch release has occurred; and removing at least one icon, in a reverse order of the displaying of the icons, according to the measured re-touch input retaining time, wherein the displaying of the first set of at least one icon and the displaying of the second set of at least one icon occurs in response to the touch input retained at the determined touch input position on the touch screen, and wherein each of the first set of at least one icon and the second set of at least one icon are displayed at a same distance from a position where the re-touch input is detected when the first set of at least one icon and the second set of at least one icon are displayed.

2. The method of claim 1, wherein the first set of at least one icon and the second set of at least one icon comprise menu icons corresponding to menus of the portable terminal.

3. The method of claim 2, further comprising:
setting types and a display order of the first set of at least one icon and the second set of at least one icon to be displayed, the setting of the types and the display order comprising:
setting a priority order of menus in a list according to a use frequency; and
setting the types and the display order of icons to be displayed on the touch screen according to the set priority order of menus.

4. The method of claim 1, wherein the displaying of the first set of at least one icon and the displaying of the second set of at least one icon comprises:
displaying a transparency of the first set of at least one icon and the second set of at least one icon according to a set display order.

5. The method of claim 1, wherein the displaying of the first set of at least one icon and the displaying of the second set of at least one icon comprises:
changing a displayed color of the first set of at least one icon and the second set of at least one icon according to a set display order.

6. The method of claim 1, wherein the displaying of the first set of at least one icon and the displaying of the second set of at least one icon comprises:
changing a displayed size of the first set of at least one icon and the second set of at least one icon according to a set display order.

7. The method of claim 1,
wherein the first set of the at least one icon and the second set of at least one icon correspond to icons of main menus, and
wherein each icon of the main menus includes at least one submenu.

8. The method of claim 7, further comprising:
setting a type and a display order of submenu icons and main menu icons which will be displayed on the touch screen.

9. The method of claim 1, further comprising:
detecting a touch applied to an icon from among the displayed first set of at least one icon and the displayed second set of at least one icon;
measuring a touch input retaining time for the touched icon; and
creating and displaying at least one submenu icon included in a menu of the touched icon according to the touch input retaining time measured for the touched icon and a type and a display order of icons for at least one submenu of the menu of the touched icon.

10. A portable terminal that provides User Interface (UI), the terminal comprising:
a touch screen configured to detect a user's touch input; and
a controller configured to:
control the touch screen to detect the user's touch input at a region of the touch screen that does not contain an icon, control the touch screen to display a first set of at least one icon near a determined touch input position in response to the touch input retained at the determined touch input position on the touch screen for longer than a first time interval,
control the touch screen to display a second set of at least one icon near the determined touch input position, in addition to displaying the first set of at least one icon, in response to the touch input retained at the determined touch input position on the touch screen for longer than a second time interval plus the first time interval, the second time interval being sequential to the first time interval,
detect a number of icons included in the displayed first set and second set of at least one icon,
re-arrange and control the touch screen to display icons included in the displayed first set and the displayed second set of at least one icon according to information regarding icon arrangement that is set corresponding to the detected number of the icons included in the displayed first set and the displayed second set of at least one icon,
detect a touch release,
detect a re-touch input applied to a position where the touch release has occurred,
measure a re-touch input retaining time that the re-touch input is being applied to the position where the touch release has occurred, and
remove at least one icon, in a reverse order of the displaying of the icons, according to the measured re-touch input retaining time,
wherein the displaying of the first set of at least one icon and the displaying of the second set of at least one icon occurs in response to the touch input retained at the determined touch input position on the touch screen, and
wherein the controller is further configured to control, when configured to control the touch screen to display the first set of at least one icon and the second set of at least one icon, the touch screen to display each of the first set of at least one icon and the second set of at least one icon at a same distance from the determined touch input position where the touch input is detected.

11. The terminal of claim 10, wherein the controller is further configured to:
set a priority order of menus in a list according to a use frequency and types, and
display the first set of at least one icon and the second set of at least one icon on the touch screen according to the set priority order of menus.

12. The terminal of claim 10, wherein the controller is further configured to:
detect a touch release,
detect a number of at least one displayed icon, and
re-arrange at least one displayed icon according to information regarding icon arrangement that is set corresponding to the detected number of the at least one displayed icon.

13. The terminal of claim 10, wherein the controller is further configured to:
when configured to control the touch screen to display the first set of at least one icon and the second set of at least one icon, control the touch screen to display at least one of a transparency, a color, and a size of the first set of at least one icon and the second set of at least one icon according to a set display order.

14. The terminal of claim 10, wherein the controller is further configured to display a third set of icons on the touch screen, in addition to displaying the first set of at least one icon and the second set of at least one icon, in response to the touch input retained at the determined touch input position on the touch screen for longer than a third time interval occurring consecutively with the first time interval and the second time interval.

15. The terminal of claim 10, wherein the controller is further configured to set a type and a display order of sub-menu icons and main menu icons of the first set of at least one icon and the second set of at least one icon which will be displayed on the touch screen.

16. The terminal of claim 10, wherein the controller is further configured to:
  detect a touch applied to one of the first set of at least one icon and the second set of at least one icon,
  measure a touch input retaining time for the touched icon, and
  display at least one submenu icon included in a menu of the touched icon according to the touch input retaining time measured for the touched icon and types and a display order of icons for at least one submenu of the menu of the touched icon.

17. The terminal of claim 10, wherein the controller is further configured to:
  detect a touch applied to one of the first set of at least one icon and the second set of at least one icon,
  measure a touch input retaining time for the touched icon, and
  execute a corresponding function of the touched icon, according to the touch input retaining time, measured for the touched icon.

\* \* \* \* \*